US012117177B2

(12) United States Patent
Jell et al.

(10) Patent No.: US 12,117,177 B2
(45) Date of Patent: Oct. 15, 2024

(54) HANDLE FOR A DOOR OF A DOMESTIC APPLIANCE WITH SPECIFIC LIGHT GUIDANCE, AND DOOR AND DOMESTIC APPLIANCE

(71) Applicant: BSH Hausgeräte GmbH, Munich (DE)

(72) Inventors: Peter Jell, Breitbrunn (DE); Maximilian Huber, Wasserburg am Inn (DE); Jakob Mayer, Kirchanschöring (DE); Alexander Kaltenhauser, Peterskirchen (DE); Veronika Barth, Munich (DE); Charlotte Bick, Munich (DE)

(73) Assignee: BSH Hausgeräte GmbH, Munich (DE)

( * ) Notice: Subject to any disclaimer, the term of this patent is extended or adjusted under 35 U.S.C. 154(b) by 485 days.

(21) Appl. No.: 17/424,512

(22) PCT Filed: Jan. 23, 2020

(86) PCT No.: PCT/EP2020/051673
§ 371 (c)(1),
(2) Date: Jul. 21, 2021

(87) PCT Pub. No.: WO2020/156930
PCT Pub. Date: Aug. 6, 2020

(65) Prior Publication Data

US 2022/0136706 A1 May 5, 2022

(30) Foreign Application Priority Data

Feb. 1, 2019 (DE) ..................... 10 2019 201 325.2

(51) Int. Cl.
*E05B 1/00* (2006.01)
*E05B 15/16* (2006.01)
(Continued)

(52) U.S. Cl.
CPC .......... *F24C 15/024* (2013.01); *E05B 1/0015* (2013.01); *E05B 15/16* (2013.01); *E05B 17/10* (2013.01)

(58) Field of Classification Search
CPC ....... F24C 15/024; E05B 1/0015; E05B 17/10
See application file for complete search history.

(56) References Cited

U.S. PATENT DOCUMENTS 2,576,511 A * 11/1951 Jewett .................. E05B 1/0015 403/376
2,608,712 A * 9/1952 Seyforth ............... E05B 1/0015 16/419
(Continued)

FOREIGN PATENT DOCUMENTS

CN 101258373 A 9/2008
DE 20002651 U1 5/2001
(Continued)

OTHER PUBLICATIONS

National Search Report CN 202080011988.5 dated Jan. 6, 2022.
International Search Report PCT/EP2020/051673 dated May 6, 2020.

*Primary Examiner* — Jason W San
(74) *Attorney, Agent, or Firm* — Michael E. Tschupp; Brandon G. Braun; Andre Pallapies

(57) ABSTRACT

A handle for a door of a household appliance includes an elongated front strip configured as a plate having at least one region which is transparent. A handle bracket is connected to the front strip for positioning the handle on the door. Arranged in the handle is a light source which includes a light-guiding element with which light from the light source can radiate from the front strip. The front strip covers a front side of the light-guiding element, with light radiated from
(Continued)

the light-guiding element radiating at least through a light-permeable material region of the front strip.

18 Claims, 3 Drawing Sheets

(51) Int. Cl.

| | |
|---|---|
| ***E05B 17/10*** | (2006.01) |
| ***F24C 15/02*** | (2006.01) |

(56) References Cited

U.S. PATENT DOCUMENTS 4,908,743 A * 3/1990 Miller ........................ F21V 5/04 362/240
5,103,382 A * 4/1992 Kondo ................... B60Q 1/302 362/372
5,493,756 A * 2/1996 Shanok ..................... E05B 1/04 16/444
5,499,170 A * 3/1996 Gagne ..................... F21S 8/032 362/240
7,374,319 B2 * 5/2008 Camarota ........... E04F 11/1804 362/399
10,139,156 B2 * 11/2018 Thomas .................. A47F 11/10
10,393,362 B2 * 8/2019 Wallace .............. F21V 33/0024
11,084,585 B2 * 8/2021 Jolley .................. B64D 11/003
11,419,434 B1 * 8/2022 Artwohl ................ F25D 23/028
11,428,401 B2 * 8/2022 Edwards ................ A47K 10/38
D965,648 S * 10/2022 Kim ............................... D15/89
2011/0199005 A1 * 8/2011 Bretschneider ........ H05B 41/02 362/225
2012/0127696 A1 * 5/2012 Glovatsky ............... D06F 34/32 362/92
2013/0279966 A1 * 10/2013 Roberts ................. E05B 1/0069 401/207
2016/0297353 A1 * 10/2016 Takahashi ................ G02B 6/00
2018/0099610 A1 * 4/2018 Meyers ................. F21V 19/003
2019/0360234 A1 * 11/2019 Alkoby .................. A47B 95/02
2022/0170292 A1 * 6/2022 Dulmes .................... A47K 3/34

FOREIGN PATENT DOCUMENTS

DE 102010003103 A1 9/2011
DE 102016215651 A1 2/2018
KR 20180049674 A 5/2018

* cited by examiner

HANDLE FOR A DOOR OF A DOMESTIC APPLIANCE WITH SPECIFIC LIGHT GUIDANCE, AND DOOR AND DOMESTIC APPLIANCE

CROSS-REFERENCES TO RELATED APPLICATIONS

This application is the U.S. National Stage of International Application No. PCT/EP2020/051673, filed Jan. 23, 2020, which designated the United States and has been published as International Publication No. WO 2020/156930 A1 and which claims the priority of German Patent Application, Serial No. 10 2019 201 325.2, filed Feb. 1, 2019, pursuant to 35 U.S.C. 119(a)-(d).

BACKGROUND OF THE INVENTION

One aspect of the invention relates to a handle for a door of a household appliance. The handle has an elongated front strip and at least one handle bracket which is connected to the front strip. The handle can be positioned on the door using the handle bracket. Furthermore, the handle has at least one light source which is arranged in the handle. Furthermore, the handle has at least one light-guiding element, with which light from the light source can be radiated from the front strip. Furthermore, one aspect of the invention relates to a door for a household appliance. Furthermore, one aspect of the invention relates to a household appliance.

A handle for a household appliance is known from DE 10 2011 055 279 A1. The handle has an elongated center part, to the end of which handle brackets which are curved in an S shape are joined in an integral manner. The handle is arranged on a front side of a door of the household appliance by way of these handle brackets. A light source and a rod-shaped light guide are arranged in this elongated center part of the handle. A front cover of this elongated center part has a continuous gap-type opening, through which the light guide arranged therebehind is exposed. Light which is radiated by way of the light guide radiates through this gap-type opening in the front cover.

With the afore-cited prior art, in which both the light source and also the light guide are arranged in the handle itself, the positioning of the light source and light guide is restricted by the individual molding of the S-shaped handle brackets arranged in the extension pertaining to the elongated center part. Furthermore, the light guide is accessible from the front which means that it may also become damaged.

Furthermore, embodiments of doors are also known, in which a light source is not arranged in the handle itself but instead in the door. With these embodiments, the light from the door-side light source is initially firstly radiated into the handle and distributed individually there. Embodiments of this type are complex in structure and the light guidance is complicated. Relatively high light losses can occur. The radiation of the light by way of the handle is restricted as a result.

BRIEF SUMMARY OF THE INVENTION

The object of the present invention is to create a handle for a door of a household appliance, a door and also a household appliance, in which a compact and protected structure of the components is achieved and a light-intensive and flexible generation of light images is also made possible.

This object is achieved by a handle, a door and a household appliance according to the independent claims.

One aspect of the invention relates to a handle for a door of a household appliance. The handle has an elongated front strip. Furthermore, the handle has at least one handle bracket which is separate from the front side. This handle bracket is connected to the front strip. The entire handle can be positioned on or attached to the door by means of the handle bracket. The handle has a light source which is arranged in the handle itself. Furthermore, the handle has a light-guiding element which is separate from the light source and with which light from the light source can be radiated from the front strip in a defined manner. The front strip is embodied as a plate which is transparent at least in regions and which covers the light-guiding element at the front. Light which is radiated from the light-guiding element can be radiated at least through a light-permeable material region of the front strip. Such an embodiment provides a handle, in which both the at least one light source and also the at least one light-guiding element itself are contained. This already means that the light from the light source can also be radiated extensively from the handle. As a result, light images can be radiated from the handle itself with high precision, high definition and also with high light intensity.

By means of the embodiment with the front strip embodied to be solid and uninterruptible as a plate, a front cover element is produced. As a result, the light-guiding element, which is located therebehind, is covered completely at the front. Still, it is possible for the light radiated from the light-guiding element to be able to be radiated in defined form through the front strip. As a result, when the handle is viewed from the front and thus when the front strip is viewed from the front, a light image output and radiated from the front strip is produced. This therefore also means that the light-guiding element is covered by the front strip and when the handle is viewed from the front, it can no longer be identified as such an opposing element. As a result, an improved visual appearance of the handle is also essentially achieved, even when no light image is produced. In particular, a stiller, visual appearance is also achieved as a result. The front strip is therefore used in this context both as a front end piece and thus as a cover, on the other hand also as a radiation element of the light which is radiated through the front strip from the light-guiding element. By means of the embodiment of the front strip as a plate, this front strip is embodied to be relatively thin. The structure of the handle in one direction at right angles to the longitudinal axis of the handle, in particular viewed at right angles to the front strip and in the direction of the handle brackets, is therefore reduced.

Provision can be made for the light-guiding element to be embodied in the shape of a plate. In this respect provision can be made for both a flat plate and also a specific non-flat and molded plate. By means of this embodiment, a geometrically specified light-guiding element is provided, which enables a particularly extensive light guidance. Light radiations from the light-guiding element into the front strip and from this then forward can therefore be permitted over a large length of the front strip. Relatively extensive light images with relatively long light lines can therefore also be produced very uniformly and homogenously. Furthermore, a mechanically more stable component is also produced by means of a geometric embodiment of the light-guiding element of this type. This therefore also contributes to stabilizing the entire handle. In particular, a light-guiding element of this type can also contribute to stabilizing the position of other components of the handle.

Provision is preferably made for the light-guiding element to be arranged between the front strip and the handle bracket. As a result, a sandwich structure is in effect produced. With an embodiment of this type, provision can be made for the front strip to be arranged at a distance from and thus in particular without contact with the handle bracket.

Provision is preferably made for the light-guiding element to be embodied to be elastically deformable. In particular, in this respect, an elastic compressibility of the light-guiding element is formed in one direction at right angles to the front strip. In particular, the light-guiding element is embodied to be compressible in one direction at right angles to its plane. This is one embodiment which is particularly worth highlighting. The light-guiding element is as a result additionally also formed in the same way as the tolerance compensation element. Particularly when the light-guiding element is arranged between the front strip and the handle bracket, by means of this embodiment it can also be provided as a specific spacer element. Manufacturing tolerances and position tolerances can be compensated by this elastic compressibility of the light-guiding element in this specific direction. Furthermore, by means of this elastic deformability the light-guiding element can also additionally assume the functionality of a sealing element.

In one advantageous embodiment, provision is made for the light-guiding element to be arranged as a compressible spacer element between the front strip and the handle bracket. In particular, in this respect a squeezed arrangement of the light-guiding element can be embodied between the front strip and the handle bracket. The afore-cited advantages are improved again as a result. This compressed, in particular squeezed, state can be achieved in that the handle bracket is connected mechanically with the front strip. For instance, provision can be made here for screwing or clamping or locking. With this assembly, the light-guiding element arranged therebetween is then compressed, in particular squeezed, accordingly.

The light-guiding element preferably has a size which corresponds to a size of the front strip. In particular, the dimensions of the light-guiding element with a projected view onto the front strip are smaller or at most the same size in terms of area as the dimensions of the front strip. One embodiment is also possible, in which the light-guiding element projects beyond the dimensions of the front strip.

The light-guiding element can also have a specific tub shape in respect of its plate-shaped embodiment. With an embodiment of this type, a peripheral tub edge is provided. This tub edge is preferably that region which rests with one side against a rear side of the front strip, and with the opposing side against the handle bracket. In particular, with an embodiment of this type the depression or cavity forming the tub shape is arranged without contact in relation to the rear or interior of the front strip.

Provision can preferably be made with an embodiment of this type for only this tub edge to be elastically deformable, in particular compressible.

Provision is advantageously made for the handle bracket, on its end facing the front strip, to have a support base, on which the light-guiding element rests so that it is countersunk into the handle bracket at least in regions. As a result, the light-guiding element is arranged embedded. A certain secure position is therefore reached. With an embodiment of this type, the light-guiding element can be embodied as a flat plate. Provision is in particular made in this embodiment for the orientation of the plate-shaped light-guiding element to be parallel to the plane of the front strip. In particular, with a projected view onto the front strip, the light-guiding element has a planar dimension, which is smaller than the front strip. In particular, the light-guiding element is arranged completely inside the area of the front strip when a projected view of this type forms the basis.

Provision can be made in this embodiment for the light-guiding element with its front side to rest in a planar manner on the rear side of the front strip.

In one advantageous embodiment, provision is made for the light-guiding element to be arranged countersunk in the front strip so that it is framed completely circumferentially by the handle bracket. A particularly secure position arrangement of the light-guiding element in the handle bracket itself is achieved as a result. With an embodiment of this type, provision can then also be made for the front strip and the handle bracket to rest directly on one another.

Provision is preferably made for the front strip to be embodied to be rectangular.

In this respect the front strip is an elongated, rectangular plate.

Provision can be made for the front strip to cover the light-guiding element and the handle bracket completely when the handle is viewed from a front projection. In this projected view which is directed at right angles to the plane of the front strip, the light-guiding element and the handle bracket are therefore located completely behind the front strip and therefore inside this surface of the front strip. In this regard there is no provision for a lateral overhang of the light-guiding element and/or the handle bracket.

In an advantageous embodiment, provision is made for the front strip to be embodied in an integral manner. In particular, it is embodied at least in regions, in particular completely, from real glass. By means of an embodiment of this type, the through radiation of light from the light source can take place particularly advantageously. Individual light images and/or a high homogeneity of the light image produced is enabled as a result. Similarly, it is achieved that a low light loss occurs when radiating through the front strip. The front strip can also be embodied from acrylic glass at least in regions.

In an advantageous embodiment, provision is made for the handle bracket to be embodied as an elongated channel-shaped component. In particular, the handle bracket has a length which amounts to at least 80% of the length of the front strip. The handle bracket is preferably embodied in an integral manner.

In particular, the extent, in particular with a projected view at right angles onto the front strip of the handle, of the light-guiding element amounts to at least 50% of the surface of the front strip, in particular at least 60%, in particular at least 70%, in particular at least 80%, in particular at least 90%.

In an advantageous embodiment, the handle bracket is embodied in the shape of a funnel on its side facing the front strip. This means that the handle bracket extends toward the front strip. This enables a stable connection of the front strip to the handle bracket. On the other hand, this molding of the handle bracket enables a rear engagement of the front strip, so that the front strip is also formed as a handle strip which can be gripped and engaged from the rear. In particular, the handle bracket is formed however so that a complete gripping of the front strip is not enabled. The boundary of the gripping is formed by the concavely curved wall of the funnel shape of the handle bracket.

In an advantageous embodiment provision is made for the handle bracket to be embodied to be hollow. By means of this embodiment it is provided with reduced weight so that the handle is also embodied with reduced weight. It still has high stability. One particular advantage is seen by this embodiment in that this cavity of the handle bracket can be used to receive further components. In particular, provision can be made for the light source to be arranged in this cavity of the handle bracket. Provision can preferably be made for the at least one light source to be arranged on a base of the handle bracket in this cavity.

The light source can be a light-emitting diode. A number of light sources can also be an integral part of the handle.

In one advantageous embodiment, provision is made for light-impermeable regions to be produced on an interior of the front strip. Defined zones can therefore be formed, through which the light of the at least one light source of the handle cannot be radiated. Individual light images or light patterns can therefore be produced. For instance, these can be lines or symbols or suchlike. In this respect text can also be generated as light by means of the light sources. The light-impermeable regions of the front strip can be produced as a light-impermeable film. In particular, a film of this type can be attached to a rear side of the front strip which faces the handle bracket. Alternatively, a light-impermeable coating can also be embodied. This can also be embodied on this rear side of the front strip, for instance. Furthermore, it is possible for the material composition of the front strip to be formed so that individual regions have an integrated light-impermeable material. For instance, these can be individually colored glass materials.

One further aspect of the invention relates to a door for a household appliance with a handle according to the afore-cited aspect or an advantageous embodiment thereof. A further aspect of the invention relates to a household appliance, in particular for preparing food, with a handle according to the afore-cited aspect or an advantageous embodiment thereof and/or according to a door, as was cited above.

If the handle has a number of light sources, these can also be arranged so that light cones of the radiated light from these light sources overlap the rear of the front strip in regions. As a result, individual brightness zones of the generated light pattern can also be formed. Similarly, the homogeneity of the light image can be increased in the overlapping cone regions.

Provision can be made for the light source to be embodied as a multicolor light-emitting diode. It is likewise possible for a number of light sources to be present, in which at least some are in each case embodied to radiate the light with an individual light color. Different multicolor light images can also be produced as a result. Furthermore, it is also possible for a plurality of light sources to be able to indicate dynamically changeable light images. For instance, in this context a running light can be indicated. For instance, an operating state of the household appliance can thus also be indicated optically. With a dynamic change in the light image, a pulsing of at least one light source can also be produced. A status display or a warning display can therefore be symbolized optically, for instance. Other light images or lighting patterns can also be produced.

In an advantageous embodiment, provision is made for the front strip and the handle bracket which is separate therefrom to be connected to one another by mechanical fastening means. For instance, these can be screw connections. In this context, it is also possible for feedthroughs, for instance for electrical lines, additionally to be embodied at the screw points. The light source in the handle can therefore be supplied with electrical energy. Similarly, the handle can additionally have a display unit. This can then also be supplied accordingly with energy. Furthermore, by means of this embodiment data signals can then also be transmitted by way of these mechanical connection points. Three separate screw points of this type are preferably embodied along the longitudinal direction of the handle.

Provision can also be made for the front strip to be embodied from an extrusion press profile. For instance, this can be an aluminum extrusion press profile or a plastic extrusion press profile. A front cover of this extrusion press profile can be formed by means of a transparent cover.

In particular, with this embodiment the light source can then also be arranged in the front strip itself.

Furthermore, in an advantageous embodiment, it is also possible for the light-guiding element to be exposed in relation to the side and/or upward and/or downward. In this respect these directions are arranged in a plane which is oriented parallel to the plane of the front strip. A light radiation of the light-guiding element is therefore also not only enabled through the front strip, but instead also parallel to the side and/or upward and/or downward. In particular, in this respect additional or also other light effects can be generated. In particular, an indirect background lighting of the front strip or the handle can take place in this respect. In particular, in this respect the front strip appears also to be positioned in front of a corona-type light image.

In particular, with an embodiment of this type alternatively to a front strip which is transparent at least in regions, provision can be made for the front strip to be completely non-transparent. As a result, a further independent aspect of the invention relating to a handle for a household appliance is formed.

With this embodiment, a static light image or a dynamic light image, such as for instance a pulsating light or a running light, can also be produced.

With the statements such as "top", "bottom", "front", "back", "horizontal", "vertical", "depth direction", "width direction", "height direction" and such like, the positions and orientations given with the normal use and normal arrangement of the household appliance are specified.

The features and feature combinations cited above in the description as well the features and feature combinations cited below in the description of the figures and/or shown alone in the figures cannot only be used in the respectively specific combination, but also in other combinations or on their own, without departing from the scope of the invention. Embodiments which are not shown or explained explicitly in the figures, but emanate from and can be generated from the explained embodiments by means of separate feature combinations are therefore also to be considered to be included in the invention and disclosed. Embodiments and feature combinations which do not have all the features of an originally worded independent claim are therefore also considered to be disclosed. Furthermore, embodiments and feature combinations, in particular by means of embodiments presented above, are also considered to be disclosed, which extend beyond the feature combinations presented in the backreferences of the claims or deviate herefrom.

BRIEF DESCRIPTION OF THE DRAWINGS

Exemplary embodiments of the invention are explained in more detail below on the basis of schematic drawings, in which.

DETAILED DESCRIPTION OF EXEMPLARY EMBODIMENTS OF THE PRESENT INVENTION

Figure 1:
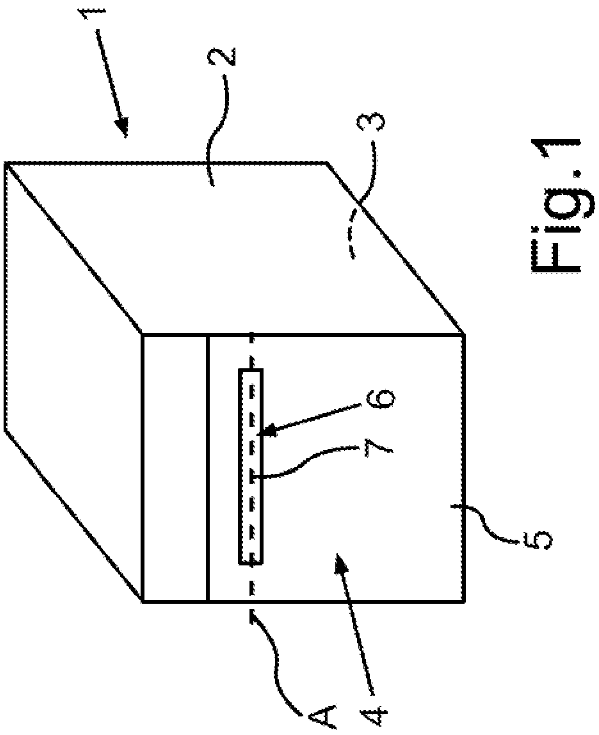
FIG. 1 shows a schematic representation of an exemplary embodiment of an inventive household appliance with an exemplary embodiment of an inventive door.

Identical or functionally identical elements are provided with the same reference characters in the figures.

Figure 2:
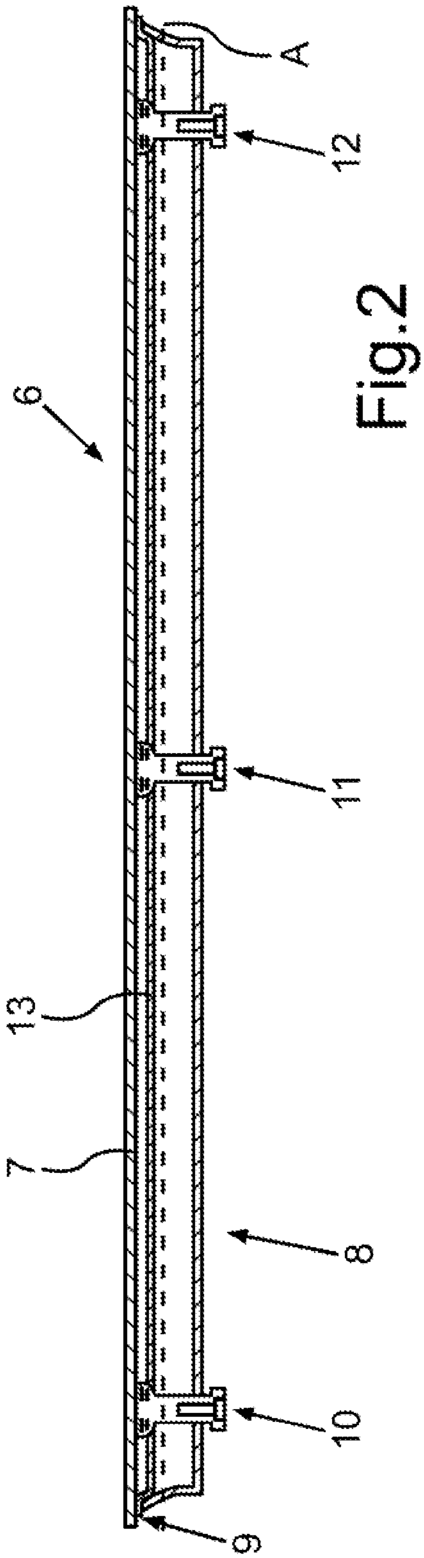
FIG. 2 shows a sectional representation by means of an exemplary embodiment of an inventive handle.

FIG. 1 shows a schematic representation of a household appliance 1. The household appliance 1 is embodied here to prepare food. It can be an oven. The household appliance 1 has a housing 2, in which a cooking compartment 3 is embodied. This cooking compartment 3 can be closed at the front by a door 4. A handle 6 is embodied on an exterior 5 of the door 4 facing away from the cooking compartment 3. The handle 6 is shown in FIG. 2 in an exemplary embodiment and is shown there in the cut representation. The handle 6 has a longitudinal axis A. It is placed on the exterior 5 and thus protrudes toward the front in relation to this exterior 5. In the exemplary embodiment shown the handle 6 has a front strip 7. Here the front strip 7 is a flat plate. It is embodied in particular in an integral manner. The front strip 7 is preferably formed from real glass. Furthermore, the handle 6 has a handle bracket 8 which is separate from the front strip 7. The handle bracket 8 here viewed in the direction of the longitudinal axis A is embodied with an identical or essentially identical length to the front strip 7. The handle bracket 8 is in particular embodied in an integral manner, for instance from plastic or metal. In the embodiment shown here, the handle bracket 8, with which the handle 6 can be attached to the exterior 5, is embodied in the shape of a funnel. This means that it is expanded in the shape of a funnel on its side 9 facing the front strip 7, as shown in FIG. 2.

Provision can be made for the handle 6 to be fastened to the door 4 by means of fastening means, in particular screw connections 10, 11 and 12.

Provision is made in particular for these screw connections 10 to 12 also to embody a mechanically fixed connection between the front strip 7 and the handle bracket 8. The screw connections 10 to 12 can also additionally be embodied as feedthroughs, in order to be able to lay electrical lines into the handle 6 from outside of the handle 6.

In particular, the handle bracket 8 is embodied to be hollow at least in regions. In this respect it therefore has a channel shape, which is expanded upward.

The front strip 7 is dimensioned so that in a projected view, in which it is looked at in a direction at right angles to the front strip 7, it completely covers the handle bracket 8 arranged therebehind. In respect of its arrangement and its surface dimensions, the handle bracket 8 is therefore contained completely within this projection surface formed by the front strip 7.

Furthermore, the handle 6 also has at least one light-guiding element 13. The light-guiding element 13 is arranged between the handle bracket 8 and the front strip 7. A light-guiding element 13 is generally an element which conducts light in a defined manner in its interior so that light is routed in a defined manner from a coupling-in point of the light-guiding element 13 to an exit point of the light-guiding element 13.

Figure 3:
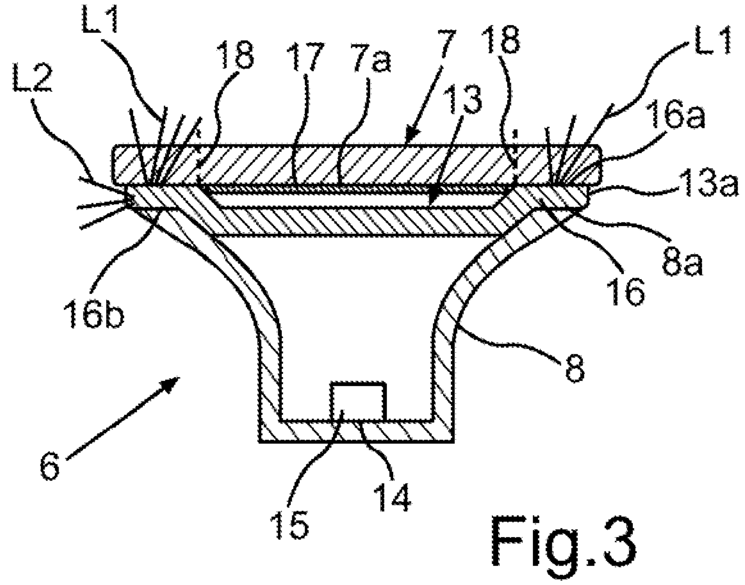
FIG. 3 shows a further sectional representation by means of an exemplary embodiment of an inventive handle.

As shown in the representation in FIG. 3, in which a sectional plane is shown at right angles to the longitudinal axis A, at least one light source 15 is arranged on a base 14 of the hollow handle bracket 8. The light source 15 is arranged at a distance from the light-guiding element 13 which is embodied in particular in an integral manner.

In the embodiment shown in FIG. 3, the light-guiding element 13 is formed in a plate-type manner. In particular, it has a tub shape here. In this respect, the light-guiding element 13 has an in particular fully peripheral web 16. This web 16 can be referred to as a tub web. As shown here, the web 16 rests with a top side 16*a* onto a rear side 7*a* of the front strip 7. With a rear side 16*b*, the web 16 rests on an upper edge 8*a* of the handle bracket 8. In particular, in this embodiment the front strip 7 is arranged without contact in relation to the handle bracket 8. In this embodiment the light-guiding element 13 is therefore also embodied as a spacer element between the front strip 7 and the handle bracket 8. The light-guiding element 13 preferably extends substantially over the same surface dimensions as the front strip 7. It is however embodied and arranged so that it does not project laterally, upward, and downward in relation to the front strip 7.

Provision is advantageously made for the light-guiding element 13 to be elastically deformable, in particular compressible, at least in regions. With the embodiment in FIG. 3, this compressibility is embodied at right angles to the plane, in which the light-guiding element 13 extends. In particular, this compressibility is therefore oriented in a direction at right angles to the longitudinal axis A and in particular in a direction which is also oriented at right angles to a longitudinal axis of the handle bracket 8. The longitudinal axis of the handle bracket 8 is oriented parallel to the longitudinal axis A.

The light-guiding element 13 can therefore also be arranged squeezed between the front strip 7 and the handle bracket 8. In particular, in this respect the web 16 can be compressed, in particular squeezed in this way. The squeezing is produced in particular when the screw connections 10 to 12 are screwed together.

Provision is made for light radiated from the light source 15 to be coupled into the light-guiding element 13 and to escape there in a defined manner at exit points and to be radiated through the front strip 7 on account of the arrangement and embodiment, wherein light L1 then escapes the front strip 7 at the front and appears as a light image within the surface of the front strip 7. In an advantageous embodiment, provision is made for the light-guiding element 13, as already mentioned above, to be exposed laterally and/or upwards and/or downwards. These directions are oriented in a plane which lies parallel to that plane in which this front strip 7 is stretched. This exposed light radiation is shown by L2 in FIG. 3. Light can therefore also in effect be radiated in two different spatial directions, namely by the light radiation L1 through the front strip 7 and also through the light radiation L2.

As furthermore apparent, the rear 7*a* of the front strip 7 is embodied to be light-impermeable at least in regions. In this respect, on this rear side 7*a*, this light-impermeable region 17 can be embodied by a printing or a film. Similarly, material which has this light impermeability can be introduced in the material of the front strip 7. Therefore in the exemplary embodiment that surface region, which extends between the lines identified with 18, is light-impermeable and the light L1 can therefore only be radiated through the front strip 7 at the edge zones of the front strip 7.

This is not restrictive, however, but only to be understood by way of example. Various other embodiments of the through-radiation of light through the front strip 7 can also be enabled.

Figure 4:
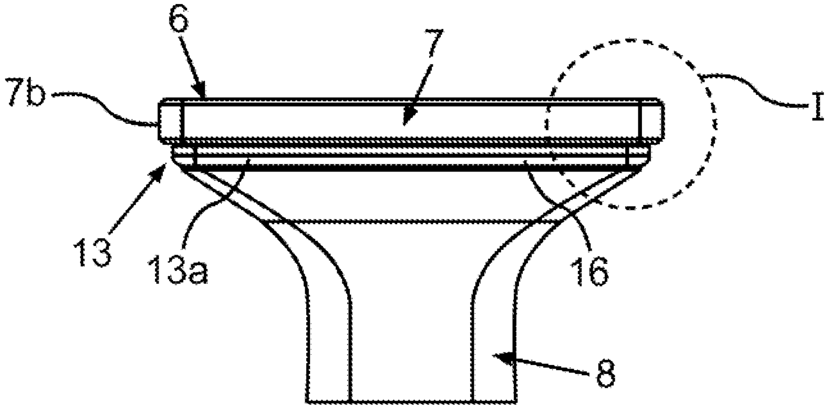
FIG. 4 shows an external view of the handle according to FIG. 3.
Figure 5:
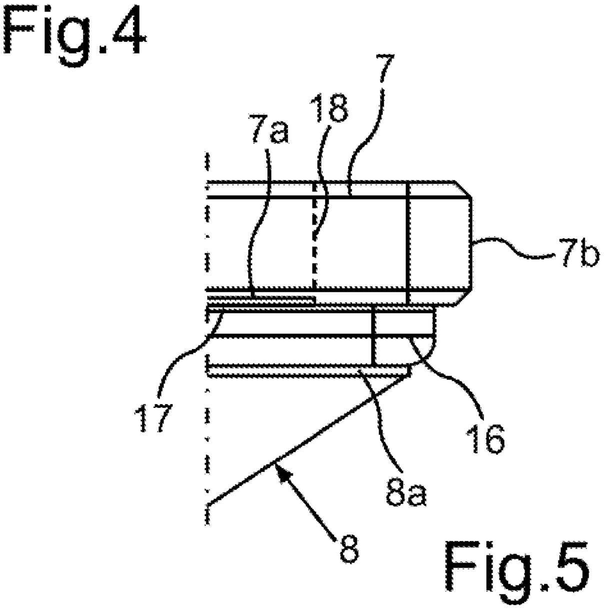
FIG. 5 shows an enlarged representation of a subregion of the handle according to FIG. 4.

FIG. 4 shows the embodiment of the handle 6 according to FIG. 3, but however with respect to a side view and not in a sectional representation. In this regard, the narrow, uninterruptible peripheral web 16 of the light-guiding element 13 is to be identified. FIG. 5 shows an enlarged representation of the subregion I in FIG. 4. It should be seen here that the web 16 ends slightly offset in relation to the dimensions of the front strip 7 in particular in relation to an edge 7*b*. Accordingly, it is embodied with the upper edge 8*a* of the handle bracket 8.

The handle bracket 8 can be embodied from a plastic. For instance, this can be a thermoplastic material. Similarly, this can be BMC (Bulk Molding Compound). An embodiment from metal, for instance a metal pressure casting component, can also be provided.

In particular, the light-guiding element 13 is embodied as a collection light guide, through which the injected light is collected. Provision can be made for the light-guiding element 13 to have an eroding structure on a side edge 13*a*, which is also then the side edge of the web 16.

Provision can be made for the edge 7*b* of the front strip to be embodied to be sanded, so that light can be better scattered.

The light-guiding element can be made from silicon, PVC (polyvinylchloride), TPU (thermoplastic polyurethane) or similar material. Provision can also be made for turbidity and/or scatter particles for homogenizing the light guide to be present in the material of the light-guiding element.

Figure 6:
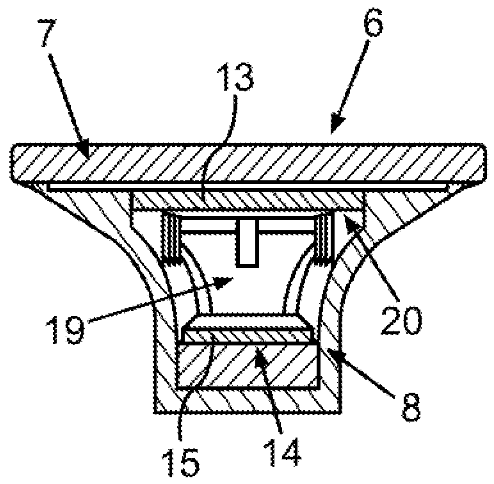
FIG. 6 shows a sectional representation by means of a further exemplary embodiment of a handle.

FIG. 6 shows a sectional representation at right angles to the longitudinal axis A of a further exemplary embodiment of a handle 6. With this embodiment the light-guiding element 13 is embodied to have a smaller area than in the embodiment according to FIG. 3 to FIG. 5. In this embodiment, the hollow handle bracket 8 has a base 20. Here the plate-shaped light-guiding element 13, which is embodied to be flat here, rests hereupon. As a result, the light-guiding element 13 is arranged countersunk in a cavity 19 of the handle bracket 8 at least in regions. In particular, a completely embedded arrangement is provided here.

In the embodiment in particular according to FIG. 6, provision can also be made for a shading film to be arranged on the rear side 7*a*. As a result, what is known as a black panel effect can also be produced. In the region the material of the front strip 7 can additionally or instead be embodied for instance as gray glass, which has a transmissivity of in particular less than 90 percent. This can also be thus embodied in other examples.

In this embodiment in FIG. 6, a seal between the front strip and the handle bracket can be produced for instance by way of a peripheral foam adhesive tape or an adhesive bead.

Figure 7:
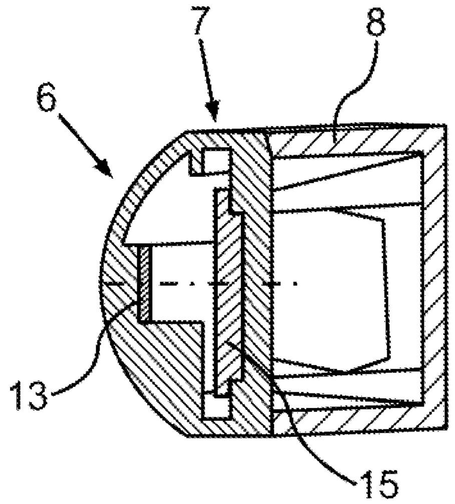
FIG. 7 shows a representation of a further exemplary embodiment of a handle in a schematic sectional representation.

Furthermore, a further exemplary embodiment of a handle 6 is shown in FIG. 7 in a sectional representation at right angles to its longitudinal axis. In this embodiment, provision is made for the front strip 7, here made from metal, to be embodied for instance as an aluminum extrusion press profile or plastic extrusion press profile. A front cover can be embodied to be transparent. In this embodiment, no light source is available in the handle bracket 8, instead in the embodiment in FIG. 7 it is arranged in the front strip 7. In this embodiment the front cover of the front strip 7, which is embodied in multiple parts here, is convexly curved.

The invention claimed is:

1. A handle for a door of a household appliance, said handle comprising:
- an elongated front strip configured as a plate having at least one region which is transparent;
- a handle bracket connected to the front strip for positioning the handle on the door;
- a light source arranged in the handle; and
- a light-guiding element configured to guide light from the light source to the front strip to radiate from the front strip,
- wherein the front strip covers a front side of the light-guiding element, with light radiated from the light-guiding element radiating at least through a light-permeable material region of the front strip, and
- the light-guiding element is arranged as a compressible spacer element between the front strip and the handle bracket.

2. The handle of claim 1, wherein the light-guiding element is embodied to be plate-shaped.

3. The handle of claim 1, wherein at least a part of the light-guiding element is arranged between the front strip and the handle bracket.

4. The handle of claim 1, wherein the light-guiding element is embodied to be elastically deformable.

5. The handle of claim 1, wherein the handle bracket has a base on a side facing the front strip, and
- wherein a rear side of said light-guiding element rests on the base such that the light-guiding element is countersunk in the handle bracket at least in a region thereof.

6. The handle of claim 1, wherein a rear side of the light-guiding element is countersunk into a front surface of the handle bracket such that a peripheral side of the light-guiding element is completely surrounded by the handle bracket.

7. The handle of claim 1, wherein the light-guiding element is configured to cover at least 50% of a surface area of the front strip.

8. The handle of claim 1, wherein the front strip has a rectangular configuration and is configured to completely cover the light-guiding element and the handle bracket in a front projected view of the handle.

9. The handle of claim 1, wherein the front strip comprises a glass front strip.

10. The handle of claim 1, wherein the handle bracket has a channel-shaped configuration and has a funnel-shaped side which faces the front strip.

11. The handle of claim 1, wherein the handle bracket is hollow, said light source being arranged in the handle bracket.

12. The handle of claim 11, wherein the light source is arranged on a base of the handle bracket.

13. The handle of claim 1, wherein the front strip has an interior with a light-impermeable region.

14. The handle of claim 13, wherein the front strip includes a light-impermeable film or a light-impermeable coating to generate the light-impermeable region.

15. A door for a household appliance, comprising:
- a handle, said handle comprising:
  - an elongated front strip configured as a plate having at least one region which is transparent,
  - a handle bracket connected to the front strip for positioning the handle on the door,
  - a light source arranged in the handle, and a light-guiding element configured to guide light from the light source to the front strip to radiate from the front strip, wherein the front strip covers a front side of the light-guiding element, with light radiated from the light-guiding element radiating at least through a light-permeable material region of the front strip, and the light-guiding element is arranged as a compressible spacer element between the front strip and the handle bracket.

16. A household appliance for preparing food, said household appliance comprising:

a door; and a handle comprising;

an elongated front strip configured as a plate having at least one region which is transparent, a handle bracket connected to the front strip for positioning the handle on the door, a light source arranged in the handle, and a light-guiding element configured to guide light from the light source to the front strip to radiate from the front strip, wherein the front strip covers a front side of the light-guiding element, with light radiated from the light-guiding element radiating at least through a light-permeable material region of the front strip, and the light-guiding element is arranged as a compressible spacer element between the front strip and the handle bracket.

17. The handle of claim 1, wherein the light-guiding element includes a front side facing a rear side of the front strip.

18. The handle of claim 1, wherein the light-guiding element includes a tub-shape having a peripheral tub edge, and wherein a front side of the peripheral tub edge abuts a rear side of a part of the front strip and a rear side of the peripheral tub edge abuts a front side of a part of the handle bracket.

* * * * *